United States Patent [19]

Ehrenhardt et al.

[11] Patent Number: 5,611,751
[45] Date of Patent: Mar. 18, 1997

[54] ENGINE SPEED CONTROL AND METHOD FOR OPERATING SAME

[75] Inventors: Kevin D. Ehrenhardt, Eureka; Gregory S. Gauger, Pekin; Prasad V. Parupalli, Peoria; Thomas R. Sandborg, Mapleton, all of Ill.

[73] Assignee: Caterpillar Inc., Peoria, Ill.

[21] Appl. No.: 533,974

[22] Filed: Sep. 26, 1995

[51] Int. Cl.⁶ .......................... B60K 41/02; B60K 41/04; F16H 37/00
[52] U.S. Cl. .......................... 477/73; 477/902; 477/107; 477/203; 74/11
[58] Field of Search .......................... 477/73, 107, 203, 477/902; 74/11; 364/424.1

[56] References Cited

U.S. PATENT DOCUMENTS 5,237,883  8/1993  Churchill et al. .................. 74/11
5,299,129  3/1994  Uchida et al. .................. 74/11 X
5,480,364  1/1996  Hillbert et al. .................. 477/73 X

*Primary Examiner*—Khoi Q. Ta
*Attorney, Agent, or Firm*—R. Carl Wilbur

[57] ABSTRACT

A preferred embodiment of the present invention includes a power take off ("PTO") controller used on a vehicle. The controller includes a PTO on/off switch, a brake/clutch ignore switch, and a PTO set/resume switch connected to an electronic controller. The controller sets the engine speed command to a PTO default speed in response to the PTO on/off switch being in an on position. By placing the brake/clutch ignore switch in an ignore position, the vehicle operator can use the brake or clutch without affecting the PTO engine speed.

15 Claims, 3 Drawing Sheets

Fig_1.

5,611,751

ENGINE SPEED CONTROL AND METHOD FOR OPERATING SAME

TECHNICAL FIELD OF THE INVENTION

The present invention relates to controls for vehicles, and more particularly, to vehicle engine speed controls.

BACKGROUND OF THE INVENTION

Many on highway trucks and other vehicles require a power take off (hereinafter referred to as "PTO") to provide power to run accessories that may include a hydraulic pump for a cement mixer on a cement truck or a trash compactor on a garbage truck. The PTO may also provide power to other pumps, blowers etc. and other accessories requiring power. Typically, PTO controls regulate the speed of the engine during PTO operation. In most prior art applications, the vehicle is brought to a stop, then the PTO control is engaged and thereafter controls the speed of the engine. The operator uses prior art PTO controls in much the same manner as a vehicle cruise control. Similar to the cruise control, there are typically two switches: 1) a PTO on/off switch that engages the control; and 2) a PTO set/resume switch that varies the engine speed.

In the prior art, the PTO control disengages when the operator presses the vehicle brake or clutch. Because most PTO control applications involve a stationary vehicle, there is no reason to use the brake or clutch during PTO operation. In some applications, however, it may be necessary to operate the PTO when the vehicle is in motion. In those cases, it would be advantageous to permit the operator to use the clutch or brake to control vehicle speed more accurately, while maintaining a set engine rpm.

SUMMARY OF THE INVENTION

The present invention preferably includes an electronic controller, a PTO on/off switch, PTO set/resume and a brake/clutch ignore switch. When the vehicle operator moves the PTO on/off switch to an on position, and sets engine rpm by depressing the throttle and then depressing the set/resume switch, the electronic controller issues a fuel delivery command corresponding to a PTO engine speed. By moving the brake/clutch ignore switch to an ignore position the operator is then able to use the brake and clutch without causing the controller to terminate PTO operation.

BRIEF DESCRIPTION OF THE DRAWINGS

Throughout the drawings and the specification like reference numbers refer to like elements.

DETAILED DESCRIPTION OF A PREFERRED EMBODIMENT

The following is a complete description of the best mode of the preferred embodiment of the invention. Although the description relates to a specific preferred embodiment, those skilled in the art will recognize that the present invention is not limited to the single embodiment described herein. To the contrary, the present invention includes all other embodiments as may fall within the spirit and scope of the present invention as defined by the appended claims.

Figure 1:
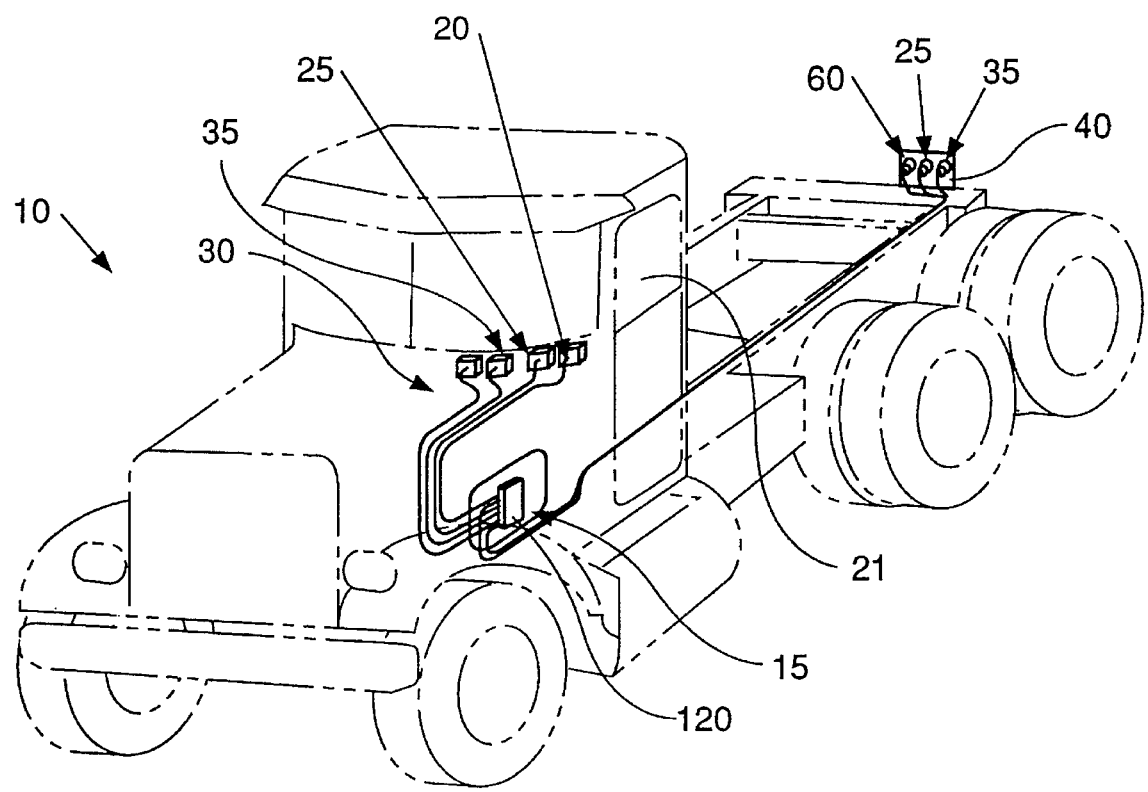
FIG. 1 is an isometric drawing of an on-highway truck employing a preferred embodiment of the PTO control of the present invention.

Referring first to FIG. 1, a vehicle 10 is shown that incorporates an embodiment of the PTO control of the present invention. The PTO controller 15 is preferably located inside the engine compartment of the vehicle 10. However, other locations can be selected for the PTO controller 15 without deviating from the scope of the present invention as defined by the appended claims. The PTO controller 15 is electrically connected to a PTO on/off switch 20, a PTO set/resume switch 35, a Brake/Clutch ignore switch 60 and a first PTO switch on lamp 25 through a wiring harness 30 or other suitable electrical connection.

Figure 2:
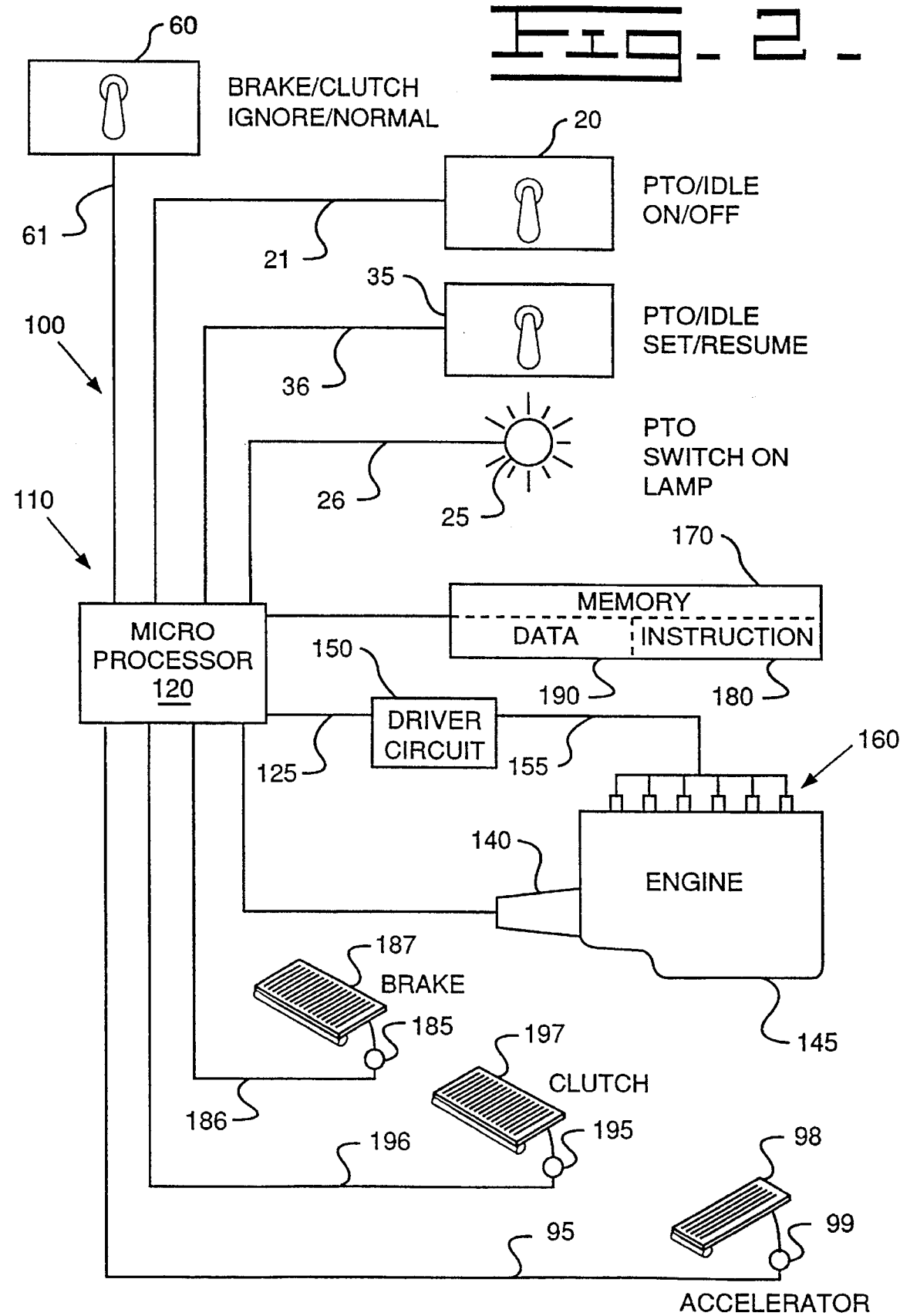
FIG. 2 is a block diagram of a preferred embodiment of the PTO control of the present invention.

Referring now to FIG. 2, a schematic block diagram of a preferred embodiment of the PTO control 100 of the present invention is shown. The control 100 includes an electronic control module 110, which in the preferred embodiment is a microprocessor 120. The microprocessor 120 used in a preferred embodiment is a Motorola 6811E2 microprocessor, manufactured by Motorola Semiconductor Products, Inc. located in Phoenix, Ariz. However other suitable microprocessors are known in the art and could be readily and easily substituted without deviating from the scope of the present invention as defined by the appended claims.

The microprocessor 120 is connected to memory 170 which may include both software instructions 180 and data 190 such as look up tables or other information. As shown in FIG. 2, the memory 170 is separate component from the microprocessor. However, as known to those skilled in the art, certain microprocessors include memory and the present invention is not limited to microprocessors requiring discrete memory. To the contrary, the present invention includes all other types of microprocessors that fall within the scope of the appended claims.

The microprocessor 120 connected to an engine speed/timing sensor 140. The engine speed timing sensor is attached to an engine 145 and preferably senses the rotational speed of the engine camshaft (not shown) and produces a signal that is a function of the speed of the rotation camshaft. In a preferred embodiment, the speed timing sensor produces a pulse width modulated signal whose duty cycle is a function of engine speed. The microprocessor 120 is also connected to a driver circuit 150 which, in turn, is connected to a plurality of fuel injectors 160 installed in individual cylinders of the engine 145. Although FIG. 2 illustrates six fuel injectors 160 it will be apparent to those skilled in the art that the number of fuel injectors may vary from the number shown and is typically dependent on the number of engine cylinders.

As is known to those skilled in the art, the microprocessor 120 produces a fuel inject signal on an electrical connector 125 which is also connected to a driver circuit 150. The driver circuit 150 produces a corresponding injection signal on electrical connectors 155 which is delivered to the individual fuel injectors 160. The microprocessor 120 calculates the timing and duration of the fuel injection signal as a function of various sensed engine parameters including the signal delivered from the engine speed/timing sensor 140 and other inputs such as a desired engine speed signal (not shown), which is sometimes calculated as a function of the position of an accelerator pedal 98 and as a function of the data 190 and instructions 180 stored in memory 170. Fuel injection timing and duration calculations performed in response to the value of various sensor inputs are well known in the art. Those skilled in the art could readily and easily program a microprocessor to calculate the timing and duration of fuel injection signals from the various engine sensor inputs. Those calculations will therefore not be discussed in detail.

As shown in FIG. 2, the microprocessor 120 is preferably connected to the PTO on/off switch 20 by a connector 21, the PTO set/resume switch 35 by a connector 36, and to a Brake/Clutch ignore switch 60 by a connector 61. The PTO on/off switch 20 preferably includes an on and an off position. The PTO set/resume switch preferably includes a set and a resume position. And, the Brake/Clutch ignore switch 60 includes an ignore position and a normal position. The microprocessor 120 is also connected to a PTO switch on lamp 25 by connector 26. The microprocessor 120 is also connected to brake and clutch pedal 185, 195 by connectors 186, 196 respectively. In a preferred embodiment, the brake and clutch pedal sensors 185, 195 comprise switches that provide a binary signal that indicates whether the pedal has been pressed. However, other embodiments could include position sensors that provide an output responsive to actual pedal position. The brake pedal sensor 185 is preferably attached to a vehicle brake pedal 187 and produces a signal on connector 186 indicating that the brake pedal 187 is being pressed to engage the vehicle brakes. Likewise, the clutch pedal switch 195 is preferably attached to the clutch pedal 197 and produces a signal on connector 196 when the clutch pedal 197 is pressed. An accelerator pedal 98 is connected to an accelerator pedal position sensor 99 that produces an output signal on electrical connector 95 indicating the position of the accelerator pedal 98. The accelerator pedal position sensor 99 is preferably a rotary position sensor of the type disclosed in U.S. Pat. No. 4,915,075 issued to Brown et. al. However, other types of position sensors are known in the art and could be readily and easily substituted for the position sensors disclosed in Brown. The present invention is not limited to the use of a single type of position sensor. To the contrary, the present invention as defined by the appended claims may include other types of position sensors.

Figure 3:
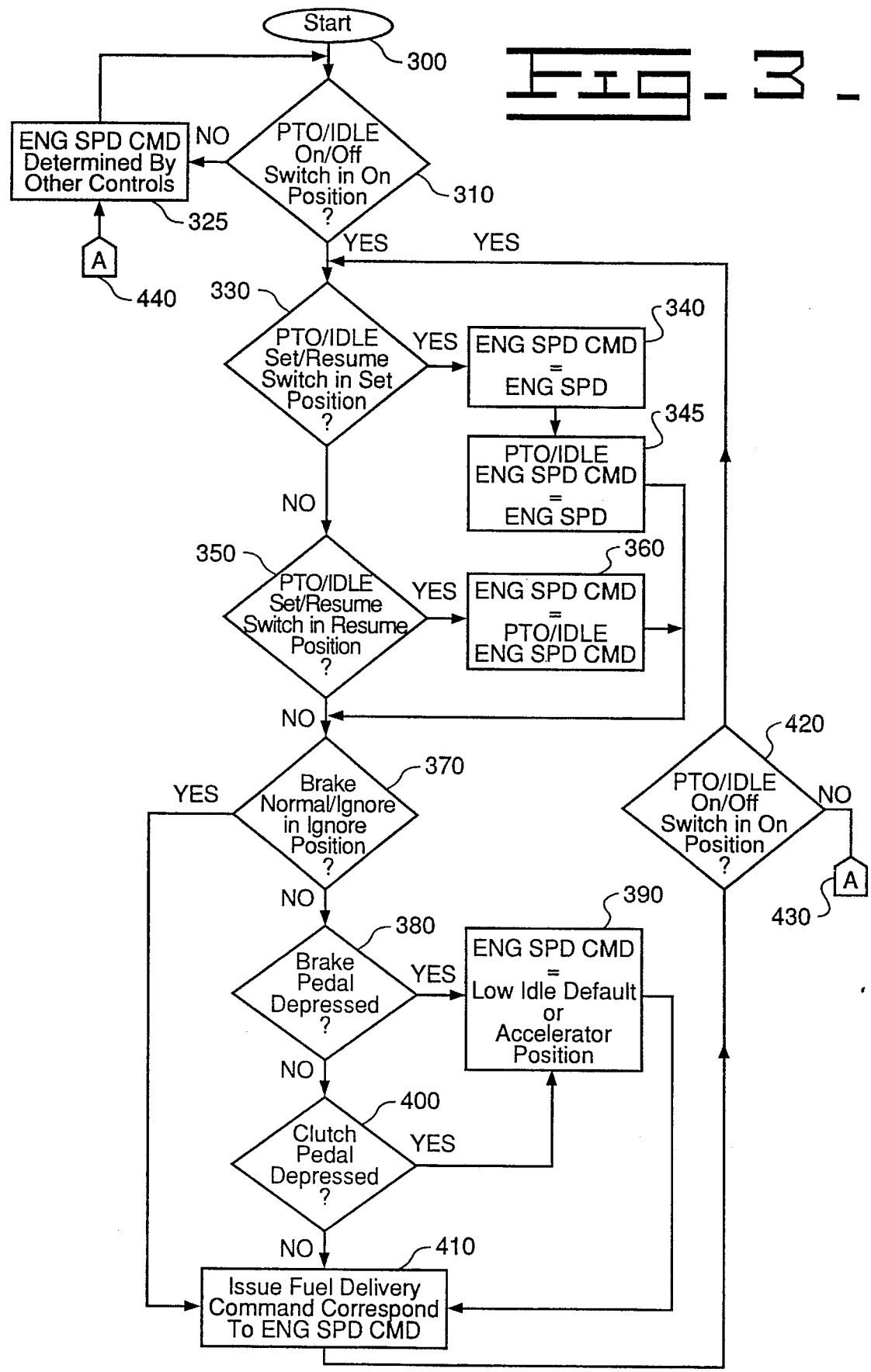
FIG. 3 is a flowchart of an embodiment of the software used in a preferred embodiment of the present invention.

Referring now to FIG. 3, a flow chart of the software for programming the microprocessor 120 of a preferred embodiment of the invention is shown. The program depicted in the flowchart is particularly well adapted for use with the 6811H2 microprocessor and associated components described above, although any suitable microprocessor may be utilized in practicing an embodiment of the present invention. The flowcharts constitute a complete and workable design of the preferred software program, and have been reduced to practice on the series 6811H2 microprocessor system. The software program may be readily coded from the detailed flowchart using the instruction set associated with this system, or may be coded with the instructions of any other suitable conventional microprocessors. The process of writing software code from a flowchart and graph such as these is a mere mechanical step for one skilled in the art.

Referring to FIG. 3, software control of a preferred embodiment of the invention begins in block 300. Program control passes from block 300 to block 310. In block 310, the microprocessor 120 evaluates the signal on connector 21 to determine whether the PTO on/off switch 20 is in the on position. If the PTO on/off switch 20 is in the on position then program control passes to block 330, otherwise program control passes to block 325 where it loops back to block 310 to assess the position of the PTO on/off switch 20.

The microprocessor 120 then calculates an injection signal in a known manner. The injection signal causes the driver circuit 150 to open the injectors 160 at appropriate times, thereby injecting fuel into the engine cylinders and causing the engine to run at the desired engine speed. From block 320, program control passes to block 330.

In block 330, the microprocessor 120 evaluates the signal on connector 36 to determine whether the PTO set/resume switch 35 is in the set or resume position. If the PTO set/resume switch 35 is in the set position, then program control passes to block 340 where the microprocessor 120 sets the variable ENG SPD CMD to the current engine speed as determined by the engine speed signal produced by the engine speed/timing sensor 140. From block 340, program control passes to block 345. In block 345, the microprocessor 120 sets the variable PTO ENG SPD CMD to the then current engine speed. Program control then passes to block 370.

If, in block 330 the PTO set/resume switch 35 is not in the set position, program control passes from block 330 to block 350. In block 350, the microprocessor 120 evaluates the signal on connector 36 to determine whether the PTO set/resume switch is in the resume position. If it is in the resume position, then program control passes to block 360 where the microprocessor 120 sets the variable ENG SPD CMD to the value stored in the variable PTO ENG SPD CMD. Program control then passes to block 370.

The loop created by blocks 330 through block 360 permits the operator to vary the PTO speed by simply pressing the accelerator pedal 98 to adjust the engine speed, then moving the PTO set/resume switch 35 to the set position. Furthermore, if the PTO control was disengaged then moving the PTO set/resume switch 35 to the resume position will cause the engine speed to return to the last stored engine speed in the PTO ENG SPD CMD.

In block 370, the microprocessor 120 evaluates the signal on connector 61 to determine whether the Brake/Clutch ignore switch 60 is in the ignore position. If it is, then program control passes to block 410 where the microprocessor issues a fuel delivery command corresponding to the value stored in the ENG SPD CMD variable. If, however, the Brake/Clutch ignore switch 60 is in the normal position then program control passes from block 370 to block 380.

In block 380, the microprocessor 120 evaluates the signal on connector 186 to determine whether the brake pedal 187 is pressed. If so, then program control passes to block 390 where the microprocessor sets the engine speed command to an idle default value stored in memory 170 or to a speed determined by the accelerator pedal position. Program control then passes to block 410 where the microprocessor issues a fuel delivery command corresponding to the idle default value or accelerator desired speed. As will be appreciated by those skilled in the art, the idle default value is a relatively low engine speed sufficient to keep the engine idling. The exact value of the idle speed default may vary from engine to engine. If, in block 380, the microprocessor determines that the brake pedal is not pressed, then program control passes to block 400.

In block 400, the microprocessor 120 evaluates the signal on connector 196 to determine whether the operator is pressing the clutch pedal 197. If so, then program control passes to block 390 where the microprocessor 120 sets the engine speed command to the idle default value or speed determined by the accelerator pedal position. Program control then passes to block 410 where the microprocessor issues a fuel delivery command corresponding to the idle default speed or the accelerator desired speed. If, in block 400, the operator is not pressing the clutch pedal 197, then program control passes to block 410 and the microprocessor 120 issues a fuel delivery command corresponding to the engine speed stored in the ENG SPD CMD variable. Program control then passes to block 420.

In block 420, the microprocessor evaluates the signal on connector 21 to determine whether the PTO on/off switch 20 remains in the on position, in which case, program control passes to block 330. Otherwise, if the operator has moved the PTO on/off switch to the off position, program control passes to block 430, block 440 and block 325 where the microprocessor disengages the PTO control and calculates the engine speed command according to other control methods.

A preferred embodiment of the present invention includes PTO set/resume 35 and PTO on/off 20 switches that are distinct from cruise control set/resume and on/off switches often found in on-highway trucks and other equipment. However, those skilled in the art could readily and easily use the existing cruise control switches in connection with an embodiment of the present invention and still fall within the spirit and scope of the claims.

Industrial Applicability

In an embodiment of the present invention, the vehicle operator can selectively decide whether pressing the brake pedal or the clutch pedal will cause the PTO control to stop maintaining a set engine speed. In some vehicle applications, it would be desirable to permit the vehicle operator to control vehicle speed by applying the brakes or pressing the clutch pedal while continuing to operate in a PTO mode. For example, one typical application in which operator control can be important is in paving operations.

Typically in paving operations, a truck must empty blacktop mix into a hopper on a paving machine. The emptying process uses a PTO to insure even delivery of the mix. Because the paver moves as it lays the blacktop, the truck must move in unison as it empties the mix. Typically, the truck is in neutral and the paver pushes it. On downgrades, for example, the truck might begin rolling more quickly than the paver which could cause the blacktop mix to spill. By modulating the brake, the truck operator can cause the truck and the paver to move in unison while continuing to operate the PTO.

In an embodiment of the present invention, the operator initially engages the PTO mode by moving the PTO on/off switch 20 to the on position. The operator then increases the engine speed to a desired level and moves the PTO set/resume switch to the set position. Thereafter the engine will continue to run at the set speed until the PTO is disengaged with the PTO on/off switch.

The operator can choose to use the brake and clutch pedals during PTO operation by moving the Brake/Clutch ignore switch 60 to the ignore position. Then control system will not disengage the PTO mode if the operator uses the brake or the clutch. However, the operator can also choose to permit the brake and clutch pedals to disengage the PTO mode by moving the Brake/Clutch pedal switch to the normal position.

We claim:

1. An apparatus for controlling a vehicle engine, said engine being connected to a power-take-off, said apparatus comprising:

an electronic controller;

a PTO on/off switch connected to said electronic controller and having an on position and an off position;

a brake/clutch ignore switch having an ignore position and a normal position and being connected to said electronic controller;

a brake pedal sensor connected to said electronic controller and producing a brake engaged signal;

a clutch pedal sensor connected to said electronic controller and producing a clutch engaged signal;

memory means connected to said electronic controller;

a driver circuit connected to said electronic controller and connected to a fuel injector;

a PTO set/resume switch having a set position and a resume position;

speed sensing means connected to said engine and to said electronic controller for producing an electrical signal corresponding to said engine speed;

wherein said electronic controller produces an engine speed command corresponding to the electrical signal produced by said speed sensing means as a function of said PTO set/resume switch being moved to said set position and said PTO on/off switch being in said on position; and wherein said electronic controller produces a fuel injection signal delivered to said driver circuit corresponding to said engine speed command when said PTO on/off switch is in the on position, and said brake/clutch ignore switch is in the ignore position.

2. The apparatus according to claim 1, wherein said electronic controller includes a microprocessor.

3. The apparatus according to claim 2, wherein said electronic controller produces a fuel injection signal corresponding to an engine speed command when said brake pedal sensor produces a brake engaged signal.

4. The apparatus according to claim 2, wherein said electronic controller produces a fuel injection signal corresponding to said engine speed command when said clutch pedal sensor produces a clutch engaged signal.

5. An apparatus for controlling a vehicle engine, said engine being connected to a power-take-off, said apparatus comprising:

an electronic controller;

a PTO on/off switch connected to said electronic controller and having an on position and an off position;

a PTO set/resume switch connected to said electronic controller, said PTO set/resume switch having a set position and a resume position;

a brake/clutch ignore switch having an ignore position and a normal position and being connected to said electronic controller;

a brake pedal sensor connected to said electronic controller and producing a brake engaged signal;

a clutch pedal sensor connected to said electronic controller and producing a clutch engaged signal;

memory means connected to said electronic controller;

a driver circuit connected to said electronic controller and connected to a fuel injector;

speed sensing means connected to said engine and to said electronic controller for producing an electrical signal corresponding to said engine speed;

wherein said electronic controller stores an engine speed command signal corresponding to said engine speed in response to said PTO on/off switch being in the on position and said PTO set/resume switch being momentarily placed in said set position: and wherein said electronic controller produces a fuel injection signal delivered to said driver circuit corresponding to said engine speed command signal when said PTO on/off switch is in the on position, and said brake/clutch ignore switch is in the normal position.

6. The apparatus according to claim 5, wherein said electronic controller produces a fuel injection signal calculated by the engine control in response to said brake sensor producing a brake engaged signal.

7. The apparatus according to claim 5, wherein said electronic controller produces a fuel injection signal calculated by the engine control in response to said clutch sensor producing a clutch engaged signal.

8. An apparatus for controlling a vehicle engine, said engine being connected to a power-take-off, said apparatus comprising:

an electronic controller;

a PTO on/off switch connected to said electronic controller and having an on position and an off position;

a brake/clutch ignore switch having an ignore position and a normal position and being connected to said electronic controller;

a brake pedal sensor connected to said electronic controller and producing a brake engaged signal;

a clutch pedal sensor connected to said electronic controller and producing a clutch engaged signal;

memory means connected to said electronic controller;

a driver circuit connected to said electronic controller and connected to a fuel injector;

speed sensing means connected to said engine and to said electronic controller for producing an electrical signal corresponding to said engine speed;

wherein said electronic controller produces a fuel injection signal delivered to said driver circuit corresponding to a value determined by engine controls when said PTO on/off switch is in the off position.

9. A method for operating a PTO control used in connection with a vehicle having an engine, an electronic controller, a brake pedal sensor, a clutch pedal sensor, a PTO on/off switch having an on and an off position, and a brake/clutch ignore switch having an ignore and a normal position, said method comprising the steps of:

sensing a position of the PTO on/off switch;

sensing a position of the brake/clutch ignore switch;

producing a fuel delivery signal corresponding to a PTO default speed in response to said PTO on/off switch being in the on position and said brake/clutch ignore switch being in the ignore position.

10. The method according to claim 9, including the steps of:

sensing a position of the brake pedal and producing a brake pedal engaged signal in response to said brake pedal being engaged; and sensing a position of the clutch pedal and producing a clutch pedal engaged signal in response to said clutch pedal being engaged.

11. The method according to claim 10, including the steps of:

incrementing said PTO default speed in response to a PTO set/resume switch being moved to a resume position and decrementing said PTO default speed in response to the PTO set/resume switch being moved to a set position.

12. An apparatus for controlling a vehicle engine said apparatus comprising:

an electronic controller;

a PTO/IDLE set/resume switch connected to electronic controller and having a set position and a resume position, a PTO/IDLE on/off switch connected to said electronic controller, said PTO/IDLE on/off switch having an on position and an off position;

memory means connected to said electronic controller;

a driver circuit connected to said electronic controller and connected to a fuel injector;

speed sensing means connected to said engine and to said electronic controller for producing an engine speed signal;

wherein said electronic controller stores a first engine speed command corresponding to said engine speed signal when said PTO/IDLE on/off switch is in said on position and the PTO/IDLE set/resume switch is moved to said set position;

wherein said electronic controller produces a fuel injection signal delivered to said driver circuit corresponding to said first engine speed command when said PTO/IDLE on/off switch is in the on position;

a brake/clutch ignore switch connected to said electronic controller and having a first and second position;

a brake pedal sensor connected to said electronic controller and producing a brake engaged signal;

a clutch pedal sensor connected to said electronic controller and producing a clutch engaged signal;

and wherein said electronic controller discontinues producing a fuel injection signal corresponding to said first engine speed command and produces a fuel injection signal corresponding to Low Idle default value in response to receiving a brake engaged signal.

13. An apparatus for controlling a vehicle engine said apparatus comprising:

an electronic controller;

a PTO/IDLE set/resume switch connected to said electronic controller and having a set position and a resume position.

a PTO/IDLE on/off switch connected to said electronic controller, said PTO/IDLE on/off switch having an on position and an off position;

memory means connected to said electronic controller;

a driver circuit connected to said electronic controller and connected to a fuel injector;

speed sensing means connected to said engine and to said electronic controller for producing an engine speed signal;

wherein said electronic controller stores a first engine speed command corresponding to said engine speed signal when said PTO/IDLE on/off switch is in said on position and the PTO/IDLE set/resume switch is moved to said set position;

wherein said electronic controller produces a fuel injection signal delivered to said driver circuit corresponding to said first engine speed command when said PTO/IDLE on/off switch is in the on position:

a brake/clutch ignore switch connected to said electronic controller and having a first and second position;

a brake pedal sensor connected to said electronic controller and producing a brake engaged signal;

a clutch pedal sensor connected to said electronic controller and producing a clutch engaged signal;

and wherein said electronic controller continues producing a fuel injection signal corresponding to said first engine speed command when said brake/clutch ignore switch is in a second position while receiving a brake engaged signal.

14. The apparatus according to claim 12 wherein said electronic controller discontinues producing a fuel injection signal corresponding to said first engine speed command and produces a fuel injection signal corresponding to Low Idle default value in response to receiving a clutch engaged signal.

15. An apparatus according to claim 13, wherein said electronic controller continues producing a fuel injection signal corresponding to said first engine speed command when said brake/clutch ignore switch is in a second position while receiving a clutch engaged signal.

* * * * *